Oct. 13, 1953
J. D. BROWN
2,655,255
PICNIC JUG
Filed Aug. 20, 1948
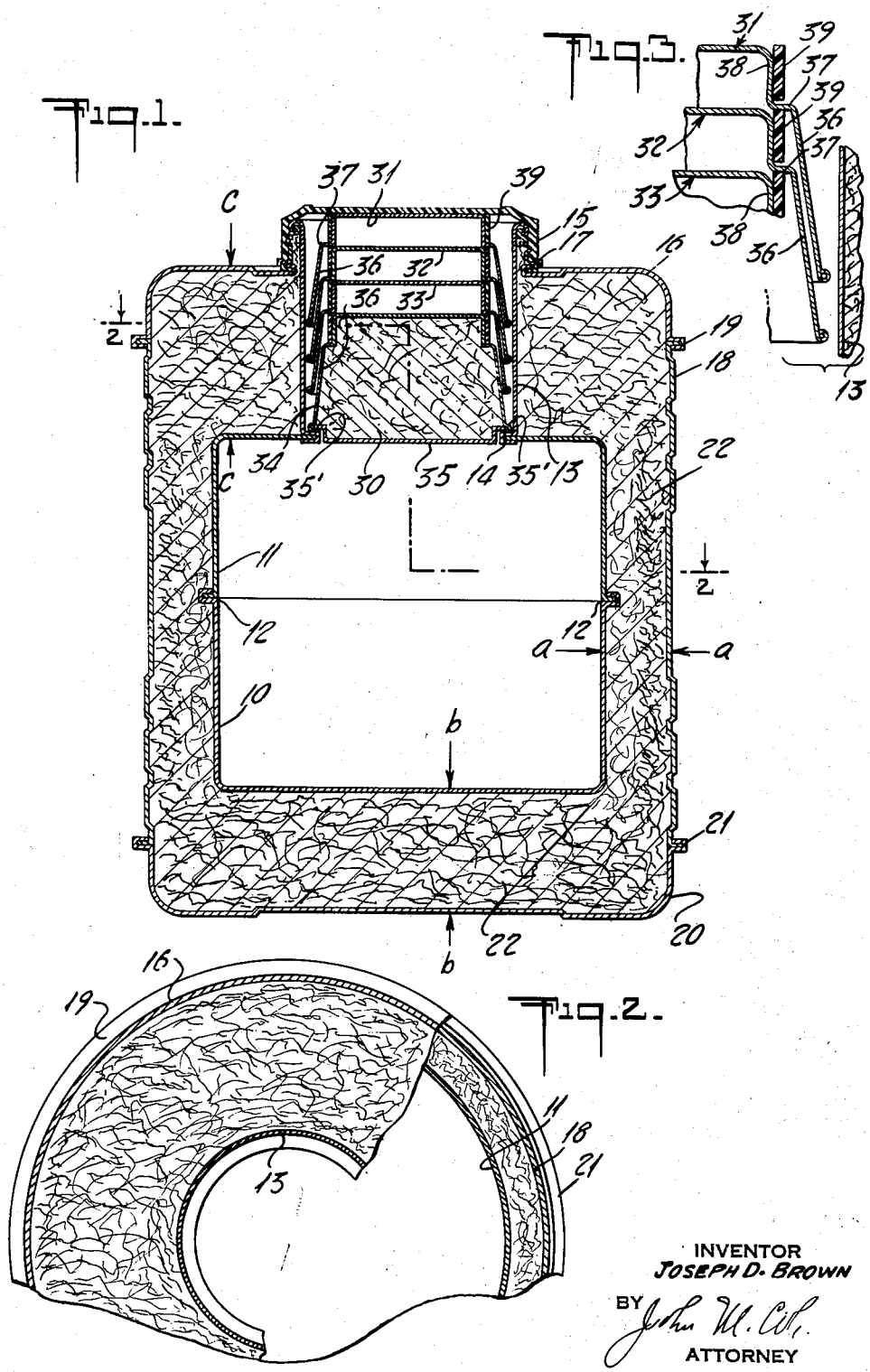
INVENTOR
JOSEPH D. BROWN
BY John M. Cox
ATTORNEY Patented Oct. 13, 1953

2,655,255

UNITED STATES PATENT OFFICE 2,655,255

PICNIC JUG

Joseph D. Brown, Eastchester, N. Y., assignor to Poloron Products, Inc., a corporation of New York Application August 20, 1948, Serial No. 45,389

3 Claims. (Cl. 206—4)

1

The present invention relates to picnic jugs and is more particularly directed toward picnic jugs so constructed as to keep the contents hot or cold as desired over long periods.

Picnic jugs as ordinarily constructed are of one gallon capacity. When filled with liquids or foods at a high temperature, which generally is not much above 190° F., the jug and food cool toward the ambient temperature. Owing to the high differential between the initial temperature and the ambient temperature, and to the fact that foods at temperatures below about 140° F. are too cool to serve as hot foods, the jugs heretofore in use have been effective to keep food sensibly hot for a period of about three to four hours. When the jug is used to store cold foods, the foods are seldom put in at temperatures less than 35° F. Up to about 55° F., foods are sensibly cool or cold foods. Owing to the much smaller temperature differential between that of cold foods and the ambient temperature, such jugs have been effective to keep foods sensibly cold for periods in the neighborhood of six hours. Where ice can be added, longer cold storage is possible.

The further object of the present invention is to provide a picnic jug with a plug and set of nested cups which can be carried in the filling spout or neck and are suitable for providing thermal insulation when placed in the jug and are suitable for use as drinking cups when removed.

The accompanying drawings show, for purposes of illustrating the present invention, an embodiment in which the invention may take form, it being understood that the drawings are illustrative of the invention rather than limiting the same.

In the accompanying drawings:

Figure 1 is a vertical sectional view through a thermal jug;

Figure 2 is a horizontal sectional view on the line 2—2 of Figure 1; and

Figure 3 is a fragmentary sectional view at an enlarged scale.

The present invention contemplates a picnic jug of the usual gallon capacity and arranged so that the foods are kept sensibly hot or sensibly cold, as the case may be, for approximately twice the period formerly available. Such jugs are suitable for storing hot foods for periods up to eight hours and cold foods for periods of ten to eleven hours. This makes it possible to have hot or cold foods, as the case may be, over much longer periods than was heretofore

2 possible with the same sized thermal jugs on the market.

The new picnic jug, has a metal liner made out of a bottom stamping 10 and a top stamping 11 seamed together as indicated at 12, and a long neck or a filling spout 13 is secured to the liner top as indicated at 14 so as to provide an inwardly extending flange. The top of the filling spout or neck 13 is secured to a threaded cap receiving ring 15. This ring in turn is secured to a top casing member 16 by a seam indicated at 17. The lower edge of the top casing member 16 is secured to a cylindrical casing member 18 by a seam indicated at 19. The bottom of the casing member 18 is secured to a casing bottom 20 by a seam indicated at 21. Before the casing parts are seamed together, a filling of insulating material such as fiberglass wool, as indicated at 22, is provided. The insulation thickness at $a$ is 1⅛", at $b$ is 2", and at $c$ is 2⅞".

Prior art jugs with the same or a similar liner, a shorter cylindrical casing member of less diameter, and similar top and bottom stampings, have insulation thickness at $a'$ of ¾", at $b'$ of 2", and $c'$ of ½".

The neck or filling spout receives an insulating filler made up of a plug member 30 and three cups 31, 32 and 33. The plug member is made of a cup shaped stamping 34, a closure plate 35 and has an insulating filling. The seamed edge 35' rests on the flange 14. The stamping 34 and the cups are alike. They have covered side walls 36, reducing shoulders 37 and cylindrical side walls 38. Insulating rings 39 are received about the walls 38. The parts are so proportioned as to be loosely received in the neck. The maximum diameter of the cups is somewhat less than the inside diameter of the neck so as to avoid substantial thermal contact. The nested walls are out of contact with one another and the insulating rings 39 separate the metal bottoms. These rings also provide insulation to protect the user's fingers when holding the cup filled with hot liquid. The cap 40 holds the filler tightly in place.

Thus it is possible to double the useful hot or cold storage period of such jugs by adding about ¼" more insulation at the sides and an average of 2½" more insulation at the top, and employing a thermal plug in the long neck made available by the greatly increased thickness of top insulation. The weight of the jug is only slightly increased.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. An insulating filler for the neck or spout of a picnic jug comprising a plug formed of an inverted, cup shaped sheet metal piece with conical walls below a reducing shoulder and cylindrical walls above the shoulder, a closure plate across the bottom of the sheet metal piece, insulation filling the intervening space, and an insulating ring about the cylindrical walls, and a plurality of cups of the same size and shape as the cup shaped piece and carrying similar insulating rings, the cylindrical walls axially spacing both the conical walls and the cup bottoms to keep them out of contact and reduce thermal transmission from one cup to the next cup.

2. A picnic jug for storing hot or cold foods and keeping the same hot or cold over extended periods, comprising a metal cylindrical food containing liner having a flat bottom and a flat top provided with a filling opening, an upwardly extending tubular metal neck secured to the liner about the opening, the neck having an internally extending flange where it joins the liner and carrying an outer, downwardly extending, threaded cap-receiving ring, an outer cylindrical casing having a side spaced from the liner side wall, a closed flat bottom and a flat top secured to the cap receiving ring, fibrous insulating material between the casing and the liner and neck, the thickness of the insulation between the bottoms being substantially twice the thickness of the insulation between the sides to offer greater resistance to heat transmission to or from the bottom of the liner, the thickness of the insulating material between the tops being substantially three times the thickness of the insulation between the sides to offer still greater resistance to heat transmission to or from the top of the liner, a closed plug having upwardly converging side walls and a flange resting on the first flange and filled with insulation, a plurality of metal cups nested with one another and with the plug, and a cap threaded on the ring and bearing on the uppermost cup to hold the filler against the flange.

3. A picnic jug for storing hot or cold foods and keeping the same hot or cold over extended periods, comprising a metal cylindrical food containing liner having a flat bottom and a flat top provided with a filling opening, an upwardly extending tubular metal neck secured to the liner about the opening, the neck having an internally extending flange where it joins the liner and carrying an outer, downwardly extending, threaded cap-receiving ring, an outer cylindrical casing having a side spaced from the liner side wall, a closed flat bottom and a flat top secured to the cap receiving ring, fibrous insulating material between the casing and the liner and neck, the thickness of the insulation between the bottoms being substantially twice the thickness of the insulation between the sides to offer greater resistance to heat transmission to or from the bottom of the liner, the thickness of the insulating material between the tops being substantially three times the thickness of the insulation between the sides to offer still greater resistance to heat transmission to or from the top of the liner, a closed, insulation filled, plug having upwardly converging side walls and a flange resting on the first flange, a plurality of metal cups nested with one another and with the plug, the plug and each of the cups carrying an insulating ring which forms contact with the adjacent cups to avoid metal to metal contact, and a cap threaded on the ring and bearing on the uppermost cup to hold the filler against the flange.

JOSEPH D. BROWN.

References Cited in the file of this patent

UNITED STATES PATENTS

| Number | Name | Date |
| --- | --- | --- |
| 358,732 | Clisbee | Mar. 1, 1887 |
| 377,603 | Damm | Feb. 7, 1888 |
| 905,449 | Morton | Dec. 1, 1908 |
| 1,145,998 | Kibele | July 13, 1915 |
| 1,610,390 | Smith | Dec. 14, 1926 |
| 1,750,334 | Stern | Mar. 11, 1930 |
| 2,038,763 | Schellens | Apr. 28, 1936 |
| 2,184,336 | Devine | Dec. 26, 1939 |

FOREIGN PATENTS

| Number | Country | Date |
| --- | --- | --- |
| 52,061 | Sweden | June 28, 1922 |